US011920909B2

(12) United States Patent
Gonzales (10) Patent No.: US 11,920,909 B2
(45) Date of Patent: Mar. 5, 2024

(54) POWDER DISPERSAL TARGET IMPACT INDICATION SYSTEM

(71) Applicant: The MUB LLC, Monument, CO (US)

(72) Inventor: Jon Paul Gonzales, Monument, CO (US)

(73) Assignee: The MUB LLC, Whispering Pines, NC (US)

( * ) Notice: Subject to any disclaimer, the term of this patent is extended or adjusted under 35 U.S.C. 154(b) by 57 days.

(21) Appl. No.: 17/576,345

(22) Filed: Jan. 14, 2022

(65) Prior Publication Data

US 2022/0214150 A1 Jul. 7, 2022

Related U.S. Application Data

(63) Continuation of application No. 16/689,854, filed on Nov. 20, 2019, now Pat. No. 11,226,184.

(60) Provisional application No. 62/769,705, filed on Nov. 20, 2018.

(51) Int. Cl.
| | |
|---|---|
| F42B 12/46 | (2006.01) |
| F41J 5/06 | (2006.01) |
| G06F 9/54 | (2006.01) |
| G06F 16/29 | (2019.01) |
| H04W 4/80 | (2018.01) |

(52) U.S. Cl.
CPC .............. F42B 12/46 (2013.01); F41J 5/06 (2013.01); G06F 9/542 (2013.01); G06F 16/29 (2019.01); H04W 4/80 (2018.02)

(58) Field of Classification Search
CPC ....... F42B 12/46; F41J 5/06; F41J 5/04; F41J 5/22; H04W 4/80; H04W 4/027; H04W 4/02; H04W 4/00; G06F 16/29; G06F 9/542
See application file for complete search history.

(56) References Cited

U.S. PATENT DOCUMENTS

| 6,848,366 | B1 * | 2/2005 | Tanner .................... C06B 45/00 149/43 |
| 8,523,185 | B1 * | 9/2013 | Gilbreath ................... F41J 5/14 434/23 |
| 2017/0254626 | A1 * | 9/2017 | Farnsworth ................ F41J 5/26 |
| 2018/0333627 | A1 * | 11/2018 | Kinner ................ A63H 33/185 |
| 2019/0041172 | A1 | 2/2019 | Kerley |
| 2020/0158482 | A1 * | 5/2020 | Gonzales ................... F41J 5/06 |

* cited by examiner

*Primary Examiner* — Jeffrey S Vanderveen
(74) *Attorney, Agent, or Firm* — Fish & Richardson P.C.

(57) ABSTRACT

A Powder Dispersal Target Impact Indication System (PDS) includes a body configured to contain a powdered substance for dispersing into air external to the body on impact of a target by a firearm projectile. A

POWDER DISPERSAL TARGET IMPACT INDICATION SYSTEM

CROSS-REFERENCE TO RELATED APPLICATIONS

This application is a continuation of U.S. patent application Ser. No. 16/689,854, filed on Nov. 20, 2019, which claims priority to Provisional U.S. Patent Application No. 62/769,705, filed on Nov. 20, 2018, which are hereby incorporated by reference in their entirety.

BACKGROUND

When engaging in shooting activities (for example, long-range recreational, competition, or military/police training), it can often be difficult to ascertain whether a target (for example, a metal plate) has been impacted by a fired projectile. Typically, the firearm operator or an assistant (such as, a "spotter") observes the target through an optical magnification device (such as, a spotting scope, riflescope, or binoculars) to determine whether the fired projectile impacts the target (for example, by movement of the target or a mark appearing on the target). In some cases, the shooter or assistant listens for a sound (such as a "ping" or "bong") indicating whether the target has been impacted. However, target distance, weather conditions, geography, lighting, and other factors can affect perception of whether a target is impacted. Also, the need for a shooter to switch back-and-forth between a firearm sighting optic and another optic to view the target can affect follow-up shots, training rhythm, and a shooting experience.

SUMMARY

The present disclosure describes a Powder Dispersal Target Impact Indication System (PDS) to assist a shooter to determine whether a fired projectile has impacted a chosen target.

In an implementation, a Powder Dispersal Target Impact Indication System (PDS) includes a body configured to contain a powdered substance for dispersal into air external to the body on impact of a target by a firearm projectile. A mounting structure is used to mount the body to the target. A securing cap is configured to retain the powdered substance within the body. A dispersal aperture is configured to disperse the powdered substance.

Some aspects of implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a shooter can better determine whether a chosen target of the firearm has been impacted with a projectile using the optical sighting device (for example, a riflescope) mounted to the firearm, as impact of the projectile on the target will cause dispersal of a visible cloud of a powdered substance into the air around the target. Second, the PDS can permit the shooter to maintain visual contact with the target and to not break a firearm hold, change body stance, or move from a position, therefore improving follow-up shots, training rhythm, and overall shooting experience. Third, in some cases, the shooter can also use the size/amount of powder dispersal to gauge if the impact was more direct to the middle of the target or to a peripheral location on the target. Fourth, the described PDS can help a shooter overcome determinations of projectile impact on a target due to excessive target distance, weather conditions, geography, lighting, or other factors can affect perception of whether a target is impacted. Fifth, the PDS can incorporate various computer technology to provide additional functionality useful for shooting activities. For example, the PDS can incorporate sensors (such as, temperature, humidity, pressure, audio, wind speed, motion, or geographic location) and report sensor and other data over a wireless network (such as, WIFI or cellular) to a computing device (such as, a mobile smartphone, tablet, or laptop) to assist in target impact determination. Other computer-controlled features can include settings for operation of lights or audio on a projectile impact, projectile weight/type settings, dispersal amount aperture opening sizes, reporting impacts to scoring-type software, and other related functions, adjustments, or settings consistent with this disclosure.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 1 is an image of target with an installed Powder Dispersal Target Impact Indication System (PDS) dispersing a cloud of a powdered substance following impact of the target with a projectile, according to an implementation of the present disclosure.

FIGS. 2A-2C are images of a target in a snowy environment that demonstrate dispersal of a cloud of a powdered substance following impact of the target with a projectile, according to an implementation of the present disclosure.

FIGS. 3A-3B demonstrate views of an implementation of a PDS, according to an implementation of the present disclosure.

FIGS. 4A-4B demonstrate alternative implementations of the PDS of FIGS. 3A-3B, according to an implementation of the present disclosure.

FIG. 5 illustrates a view the PDS of FIG. 4B mounted to a target, according to an implementation of the present disclosure.

FIG. 6 is a block diagram illustrating an example of a computer-implemented system used to provide computational functionalities associated with described algorithms, methods, functions, processes, flows, and procedures, according to an implementation of the present disclosure.

Like reference numbers and designations in the various drawings indicate like elements.

DETAILED DESCRIPTION

The following detailed description describes a Powder Dispersal Target Impact Indication System (PDS) to assist a shooter to determine whether a fired projectile has impacted a chosen target, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

When engaging in shooting activities (for example, long-range recreational, competition, or military/police training), it can often be difficult to ascertain whether a target (for example, a steel plate) has been impacted by a fired projectile. Typically, the firearm operator or an assistant (such as, a "spotter") observes the target through an optical magnification device (such as, a spotting scope, riflescope, or binoculars) to determine whether the fired projectile impacts the target (for example, by movement of the target or a mark appearing on the target). In some cases, the shooter or assistant listens for a sound (such as a "ping" or "bong") indicating whether the target has been impacted. However, target distance, weather conditions, geography, lighting, and other factors can affect perception of whether a target is impacted. Also, the need for a shooter to switch back-and-forth between a firearm sighting optic and another optic to view the target can affect follow-up shots, training rhythm, and a shooting experience.

The described PDS assists a shooter to determine whether a fired projectile has impacted a chosen target by dispersing a powdered substance (such as, chalk, mica, aluminum/plastic glitter, or other visible/reflective substance) into the air around the target upon impact of the target by the projectile. The dispersed cloud of the powdered substance will be more visible than either motion or marks made on the target due to projectile impact.

Figure 1:
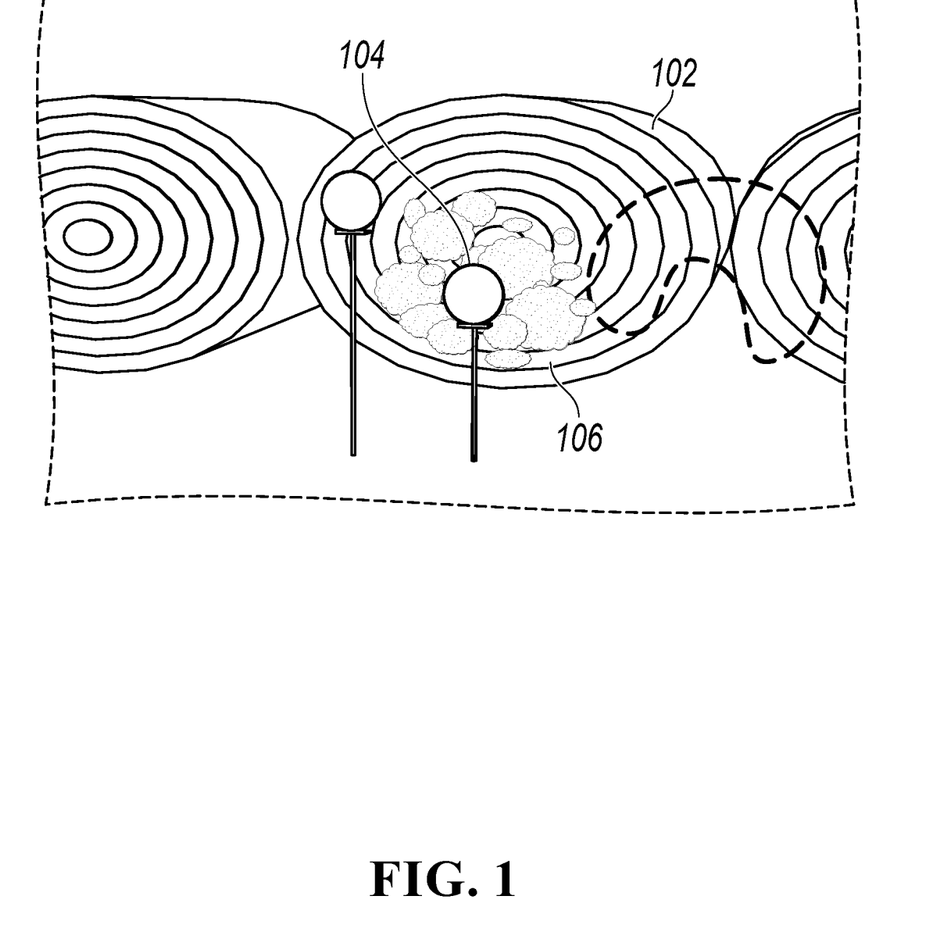

FIG. 1 is an image 100 of target with an installed PDS dispersing a cloud of a powdered substance following impact of the target with a projectile, according to an implementation of the present disclosure. Image 100 illustrates a target backstop 102 (here, a hay bale), a target 104 (a steel plate hanging by a chain from a frame), and a dashed ellipse 106 identifying a portion of the dispersed cloud of the powdered substance. As illustrated, the powdered substance is white and fine-grained, which forms a smoky-type cloud behind and, to a viewer, around the target 104. While not visible in image 100 (see, for example, FIGS. 3A-3B and 5), the installed PDS is mounted using a mounting structure (for example, magnets, clips, screws/bolts, hook-and-loop tape, or other type of fastener) to the rear of the target 104. In some implementations, the target 104 can be a metal or other reactive-type target. The PDS is mounted in a manner to remain secured to the target 104 following one or more firearm projectile impacts.

In some implementations, the type of powdered substance, the amount of the powered substance, the dispersal pattern of the powdered substance, and the direction of dispersal of the powdered substance can be adjusted. For example, adjustments can be made based on one or more of target distance from a shooter, weather conditions, geography, lighting, projectile type/weight, powdered substance (for example, type, weight, density, color, or granularity), or other factors consistent with this disclosure. In the described example of FIG. 1, a white dispersed cloud of the powdered substance is visible given the ambient lighting, backstop color, and surrounding grassy/wooded environment.

Figure 2A:
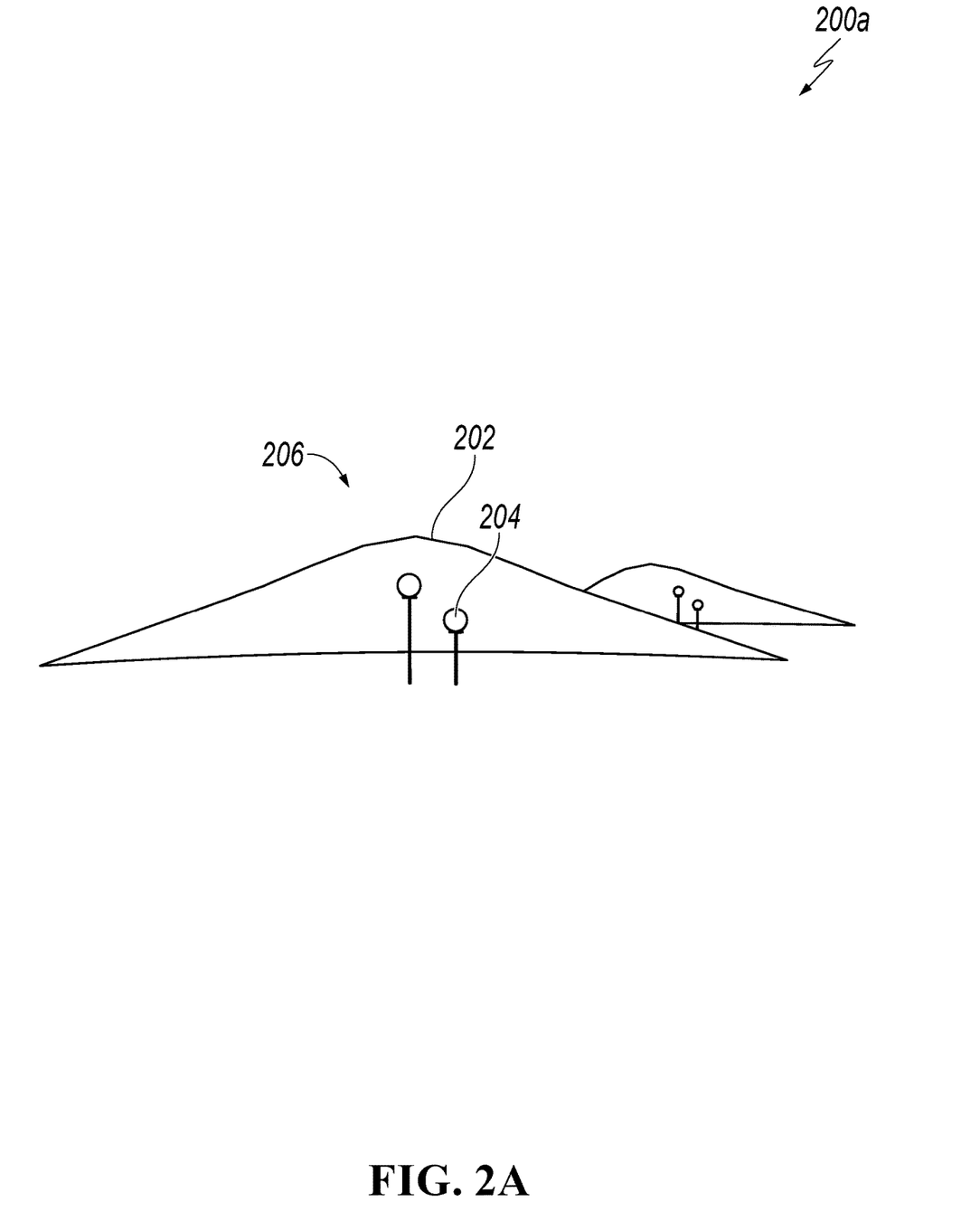
Figure 2B:
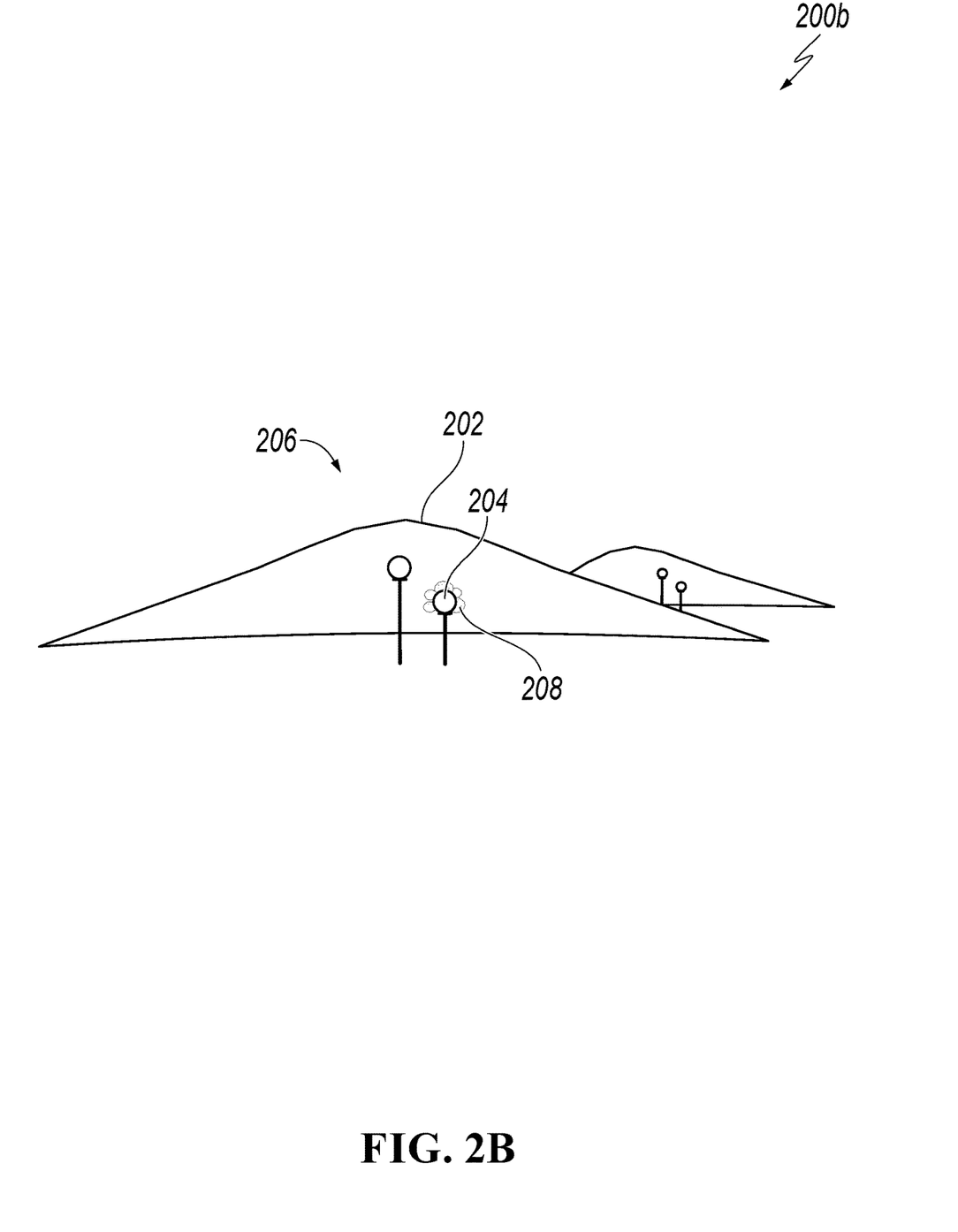
Figure 2C:
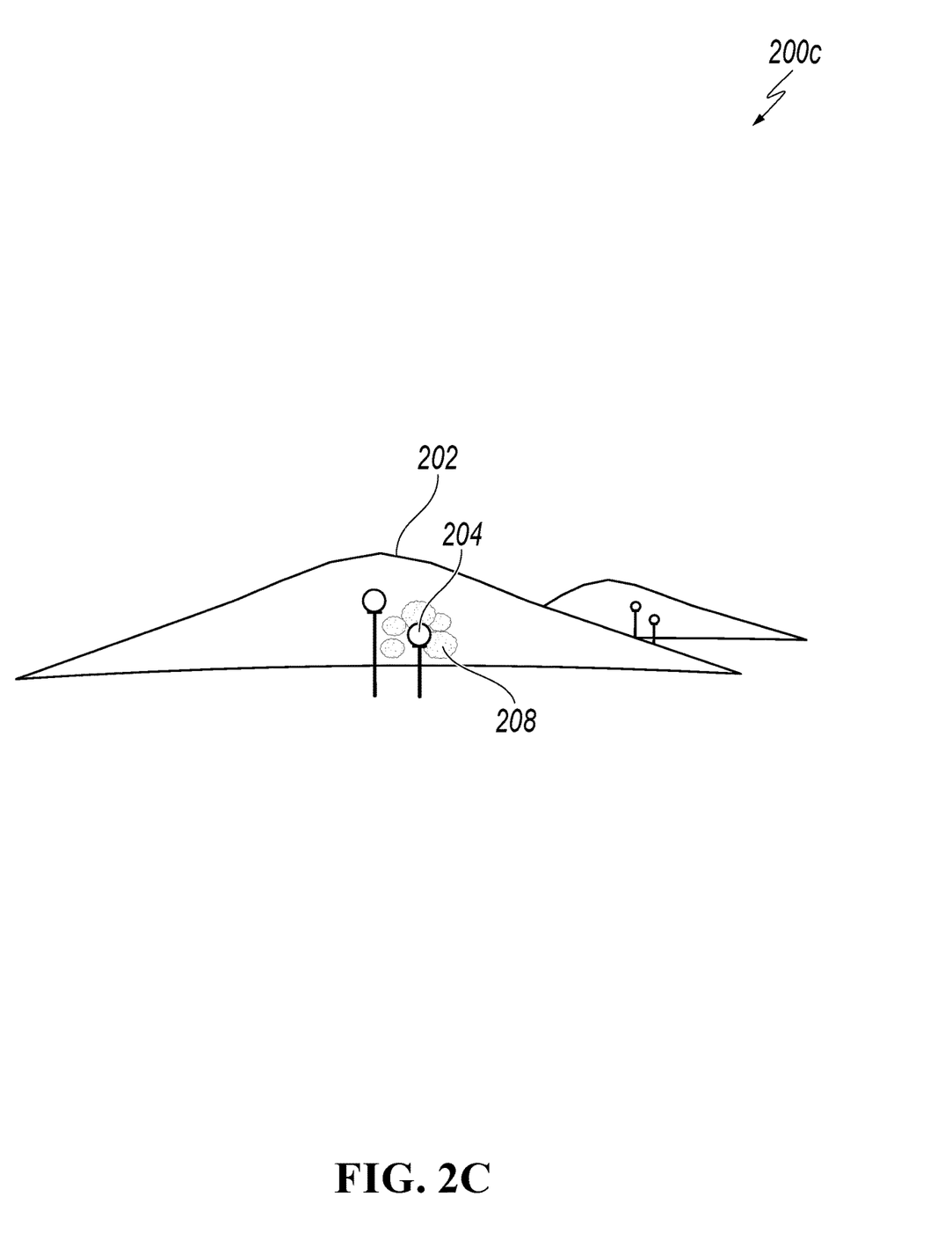

FIGS. 2A-2C are images 200a-200c of a target in a snowy environment that demonstrate dispersal of a cloud of a powdered substance following impact of the target with a projectile, according to an implementation of the present disclosure. FIG. 2A illustrates a backstop 202 (here, constructed of wood/earth) and a target 204. Even though at a distance, the target 204 may be visible (for example, colored red, yellow, or orange) against a snowy background 206, a projectile impact and resulting motion/sound may be hard to discern due to the particular shooting environment. A PDS-dispersed cloud of a powdered substance can make a projectile-impact on the target 204 more visible to a shooter. In FIG. 2B, target 204 has been impacted by a projectile (not illustrated) and the mounted PDS has begun to disperse a cloud 208 of a powdered substance to indicate the projectile impact. FIG. 2C illustrates that the cloud 208 of the powdered substance has dispersed to a greater degree for increased visibility.

Figure 3A:
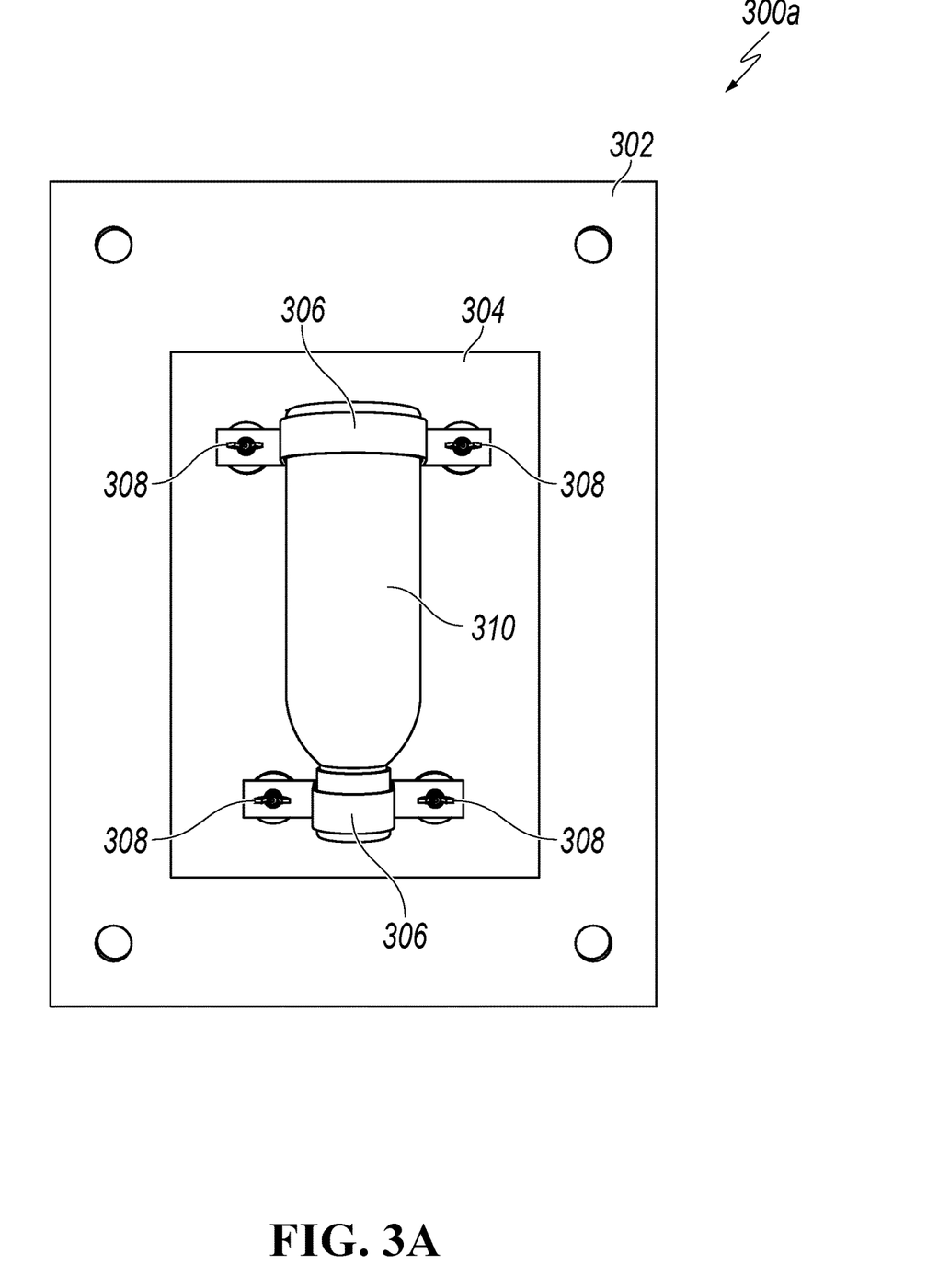
Figure 3B:
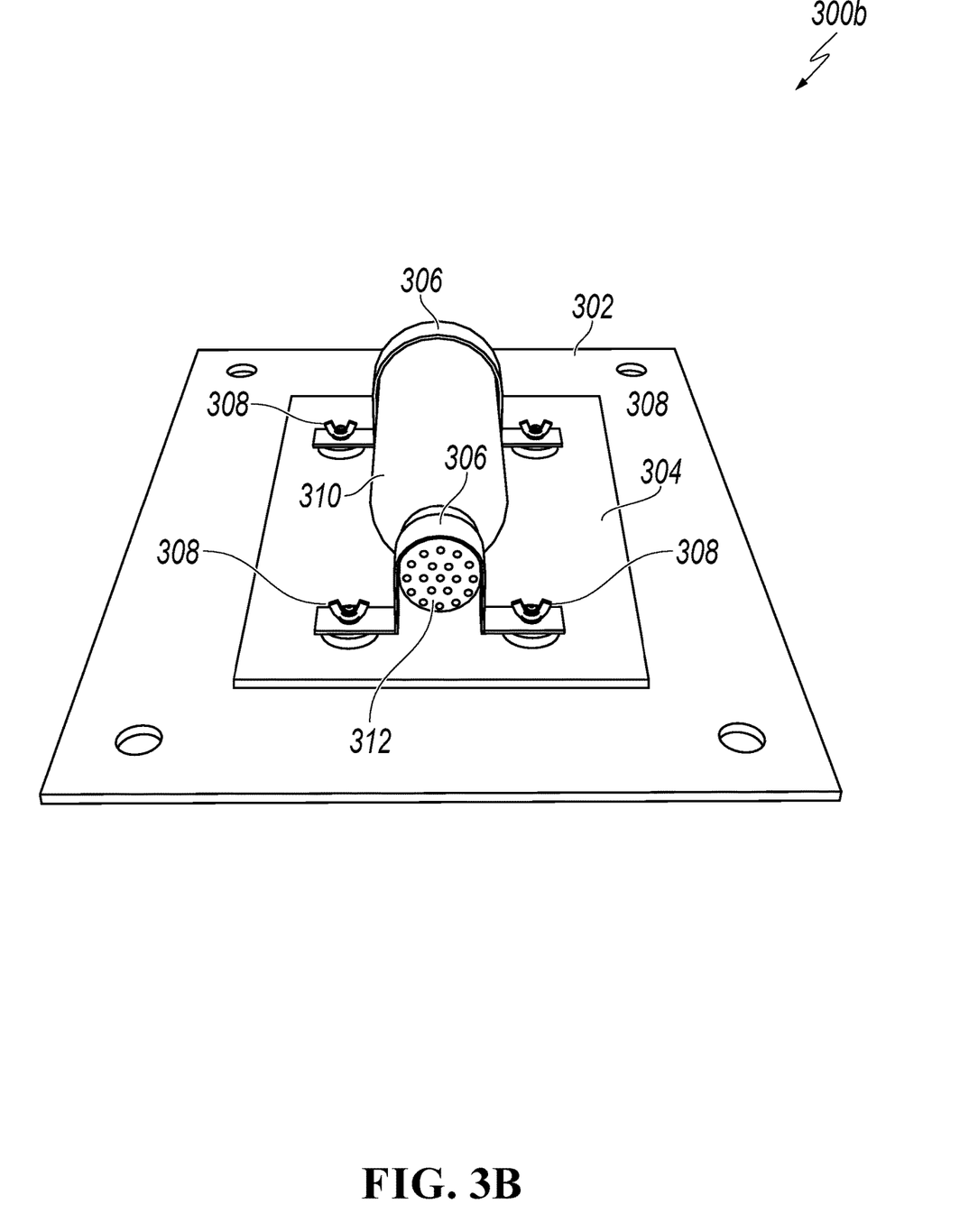

FIGS. 3A-3B demonstrate views 300a-300b of an implementation of a PDS, according to an implementation of the present disclosure. The view 300a includes a target 302 (here, steel), mounting plate 304, brackets 306, mounting structures 308, and powdered substance container 310. The powdered substance container 310 is secured to the mounting plate 304 by mounting structure 308 (here, screws, wingnuts, and flexible washers). In some implementations, the powdered substance container 310 can be a rubber-type bladder or other container.

FIG. 3B is a perspective (end) view of the PDS of FIG. 3A. The PDS works by absorbing the kinetic energy of a projectile impacting the target 302 (illustrated in FIG. 3A) and transferring the kinetic energy to the powdered substance container 310. A vibratory/pressure wave builds within the air and powdered substance within the powdered substance container 310 and induces dispersal of the powdered substance from the dispersal aperture 312. In testing, optimum dispersal appears to occur with a ratio of approximately ¾ powdered substance and ¼ air in the powdered substance container 310. By leaving the PDS ¾ filled with the powdered substance, a pocket of air generates a percussive wave as the projectile hits the target 302. The percussive wave in the air quickly forces a small amount of the powdered substance out of the dispersal aperture 312. Overfilling the powdered substance container 310 (for example, past the recommended ¾ amount of powdered substance) may cause a less-than-optimum dispersal of the powdered sub stance.

In some implementations, while not illustrated, implementations of the PDS can be configured with compressed air canisters and related mechanical mechanisms to force an amount of the powdered substance from the PDS/powdered substance container (such as, 310) in response to a detection (such as, by mechanical or computer-controlled methods) of an impact of a target by a projectile. For example, for computer-controlled detection, refer to the following discussion related to FIG. 6).

In some implementations, the powdered substance can be similar to baby powder, a GOLD BOND-type substance, glitter, mica, or other substances. Colors or reflectivity of the powdered substance can be selected based on target distance from shooter, weather conditions, geography, lighting, or other factors.

In some implementations, the PDS can be used to provide particular hit indications in response to an impact from a projectile. For example, hit indications can include blue or pink powders as a gender reveal for expecting parents.

As illustrated, dispersal aperture 312 includes a series of holes to permit dispersal of the powdered substance within the powdered substance container 310. For example, the dispersal aperture 312 can be configured with a series of one or more holes of adjustable size. In some cases, the holes can be configured to be larger or smaller (for example, small, medium, and large, or adjustable through a range of varying sizes from small to large) depending on, for example, a distance between a shooter and the target 302 (for example, the holes can be configured to be larger for greater shooter/target distance, projectile size/weight, or other criteria so as to permit dispersing a larger amount of the powdered substance) or based on characteristics of the powdered substance (for example, type, granularity, weight, density, or other characteristic). In some implementations, the series of holes on a dispersal aperture 312 can vary in size (for example, some small, some medium, and some large) to permit a mix of different types of powdered substances to be used. In these cases, for example, a direct hit of a projectile on a target may cause a particular powdered substance to be released through the varying size holes, but an indirect or glancing impact on the target may not. In some implementations, the PDS can be configured with a computer, software, automated mechanisms (for example, electric motors), or other components to permit automated/remote configuration of the dispersal aperture 312.

Figure 4A:
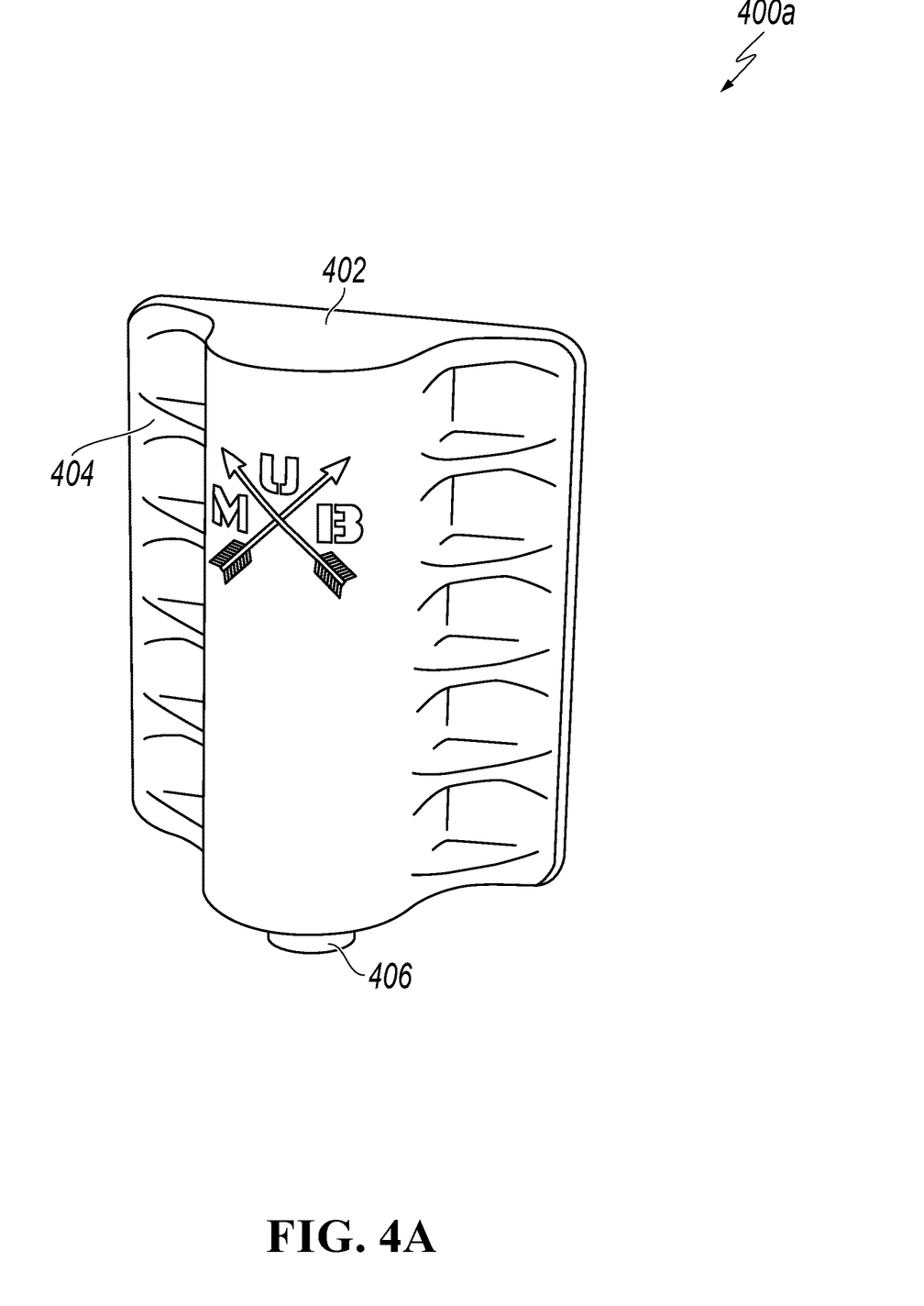
Figure 4B:
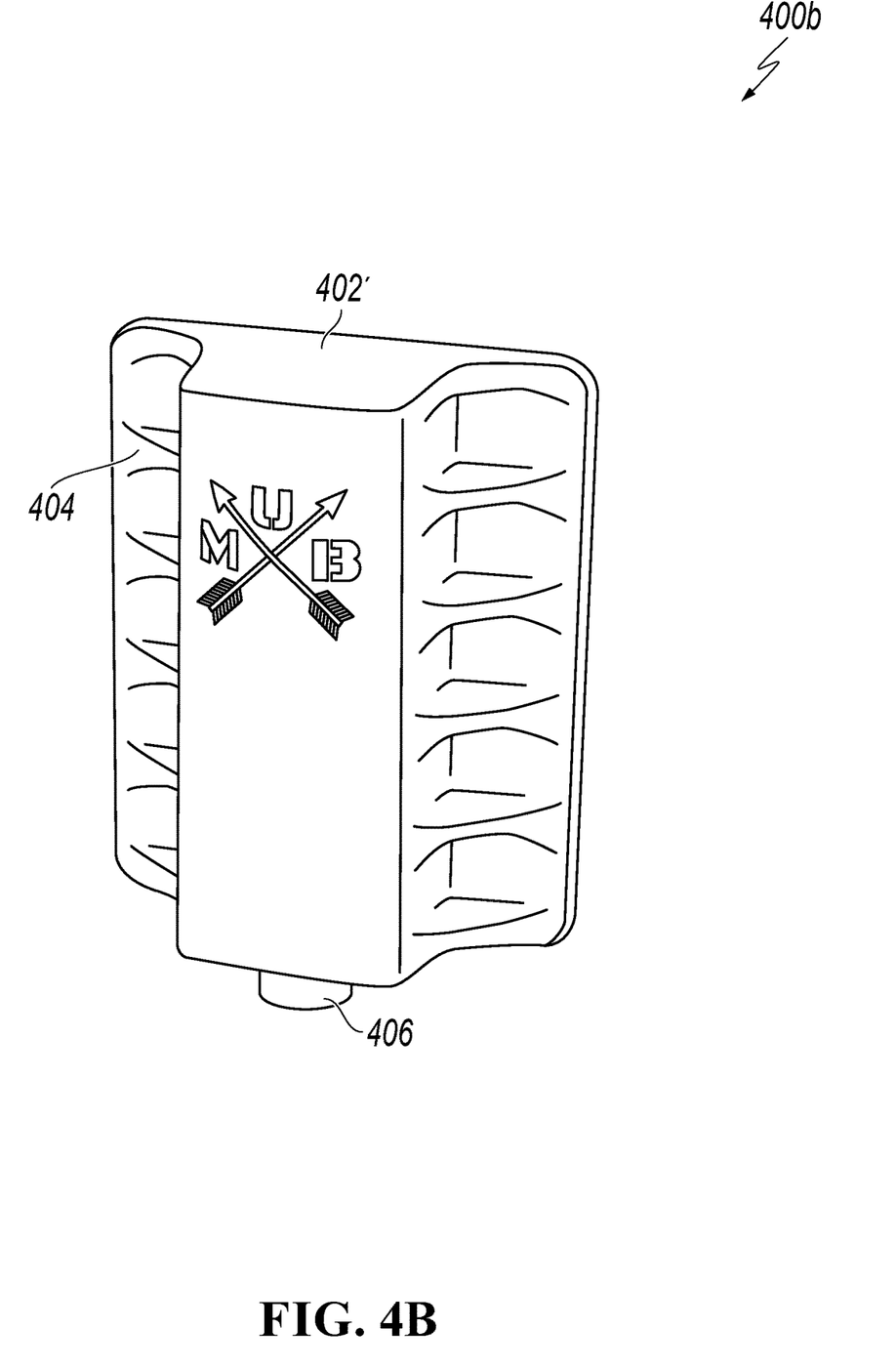

FIGS. 4A-4B demonstrate alternative implementations 400a-400b of the PDS of FIGS. 3A-3B, according to an implementation of the present disclosure. FIG. 4A illustrates a configuration of the PDS with a body 402. In some implementations, one or more of the elements of the PDS can be molded, machined, printed, extruded, injected, or created in any manner consistent with this disclosure. The PDS can be configured to be of a size suitable to be mounted to various targets. Materials used for the components of the PDS can include polymer, metal, ceramic, composites, or other materials consistent with this disclosure.

The body 402 includes supporting ribs 404 to provide structural support to the body 402 of the PDS. While not illustrated in detail, the body 402 can contain a removable powdered substance container (with/without an integral dispersal aperture 406) or be directly filled with a powdered substance. For example, in a configuration of the PDS that contains a removable powdered substance container with an integral dispersal aperture 406, the bottom of the body 402 can include a securing cap (for example, in a ring shape) to retain the powdered substance (in the removable powdered substance container) within the body 402 but to permit a dispersal aperture 406 that is part of (for example, screwed onto) the removable powdered substance container to extend from the bottom of the body 402. In a configuration of the PDS where a portion of the interior of the body is directly filled with a powdered substance, the bottom of the body 402 can be configured with a securing cap with an integral dispersal aperture 406 that extends from the bottom of the body 402 to permit dispersal of the powdered substance. Any other configuration of the body to retain a powdered substance to be dispersed through a dispersal aperture and consistent with this disclosure is considered to be within the scope of this disclosure.

Although not illustrated, the rear surface of the PDS can contain mounting-type structures to permit attachment of the PDS to a particular target (such as, target 104 in FIG. 1 or target 204 in FIGS. 2A-2C). In some implementations, the mounting structures can include magnets, adhesive strips, hook-and-loop tape, clips, or other mounting structures consistent with this disclosure.

FIG. 4B illustrates an alternative implementation of the PDS illustrated in FIG. 4A. As illustrated, the body 402' of the PDS of FIG. 4B is rectangular in shape. As will be appreciated by those of ordinary skill in the art, any shape consistent with this disclosure is considered to be within the scope of this disclosure.

Figure 5:
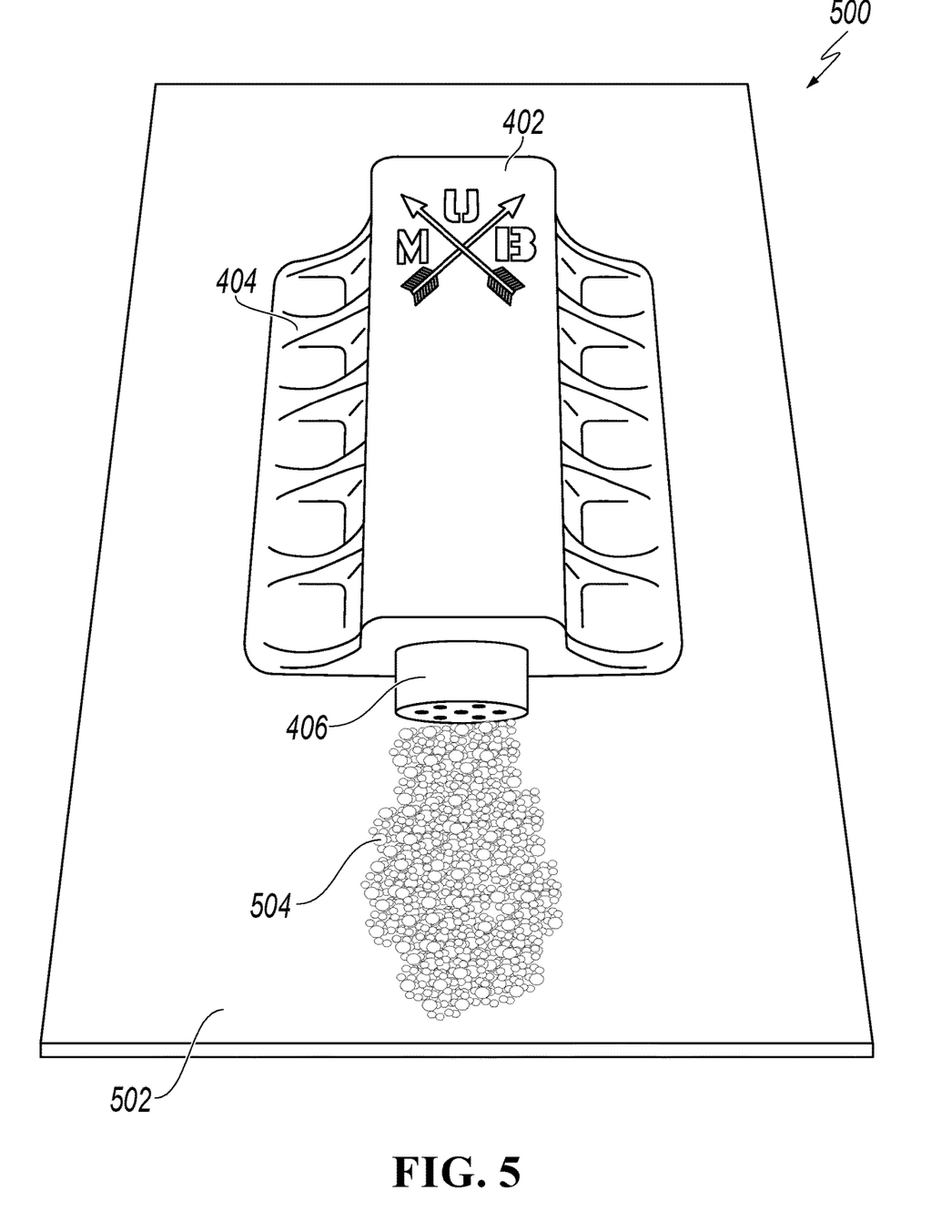

FIG. 5 illustrates a view 500 of the PDS of FIG. 4B mounted to a target 502, according to an implementation of the present disclosure. As illustrated in FIG. 5, dispersal aperture 406 has permitted a powdered substance 504 to be dispersed from the PDS.

Figure 6:
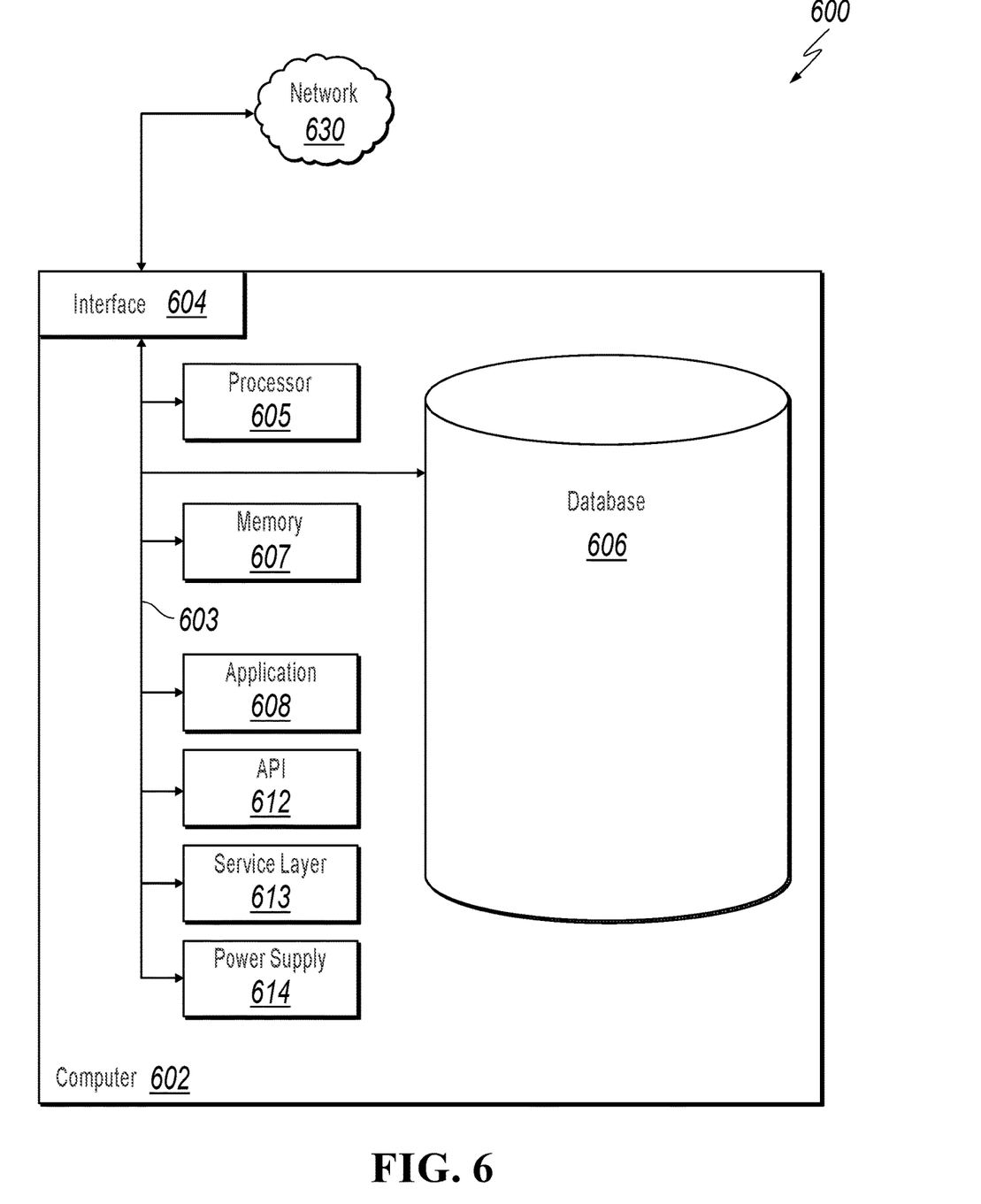

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

In some implementations, the described PDS (that is configured to disperse a powdered substance on impact of a target by a projectile) can be configured to incorporate various computer technologies to provide additional functionality useful for shooting activities. For example, implementations of the described PDS can be configured to incorporate sensors (such as, temperature, humidity, pressure, visual, audio, wind speed, motion (such as, using an accelerometer/gyroscope), or geographic location (for example, using the Global Positioning System (GPS)) and to report sensor and other data (for example, with messages) over a network (such as, WIFI or cellular) to a computing device (such as, a smartphone, tablet, or laptop) to assist in target impact, powdered-substance dispersal, or other determinations.

In some implementations, the PDS can be configured to incorporate computer-controlled features including, but not limited to, operating lights (such as, flashing one or more light-emitting diodes to indicate impact of a target by a projectile, to indicate a low powdered substance level in the PDS, or to illuminate a dispersed powdered substance to make the dispersed powdered substance more visible) configured as part of the PDS (not illustrated—but, for example, arranged in a row along a surface of the PDS body 402), generation of one or more audio tones using a speaker(s) (not illustrated) configured as part of the PDS (for example, to indicate an impact or low powdered substance level in the PDS), to disperse a particular amount of the powdered substance (for example, based on a determined distance between shooter and target, aperture opening size, or type of powdered substance), and to establish a dispersal direction (for example, the dispersal aperture can be configured to be manually or automatically directionally oriented). In some implementations, computer-controlled feature operation/settings can be based on, for example and not limited to, projectile impact, projectile weight/type, and degree of motion of the target (such as, determined following a projectile impact on the target). For example, a direct impact of the target by a projectile can cause the target to swing or tilt more than a glancing impact. As a result, more or less powdered substance, differing light intensity/patterns, or different audio tones can be used to indicate this fact. In some implementations, the PDS can be configured to be used without a powdered substance (for example, with just operating lights or audio tones) to indicate projectile impacts on a target. In other implementations, the PDS can be configured to be used with one or more combinations of powdered substance dispersal, operating lights, wireless indications/messages, or audio tones. In some implementations, the PDS can be configured to be "silent" and to indicate an impact (and, in some implementations, related data) of a projectile on a target only by using data transmitted to one or more remote computing devices (such as, a smart phone or other mobile computing device). In other words, powdered substance dispersal, operating lights, or audio tones can be disabled in these implementations.

In some implementations, software integrated into the PDS can be used to report projectile impacts to scoring-type software using a wireless network. For example, the impact itself and quality of the impact (that is, a calculated position on the target based on available sensor data—such as degree of target swing, target orientation with respect to the horizontal/vertical axis, and other data/calculations) can be used for scoring purposes for one or more PDS-enabled targets.

The described computer hardware/software can also be used for other functions, adjustments, or settings consistent with this disclosure.

Described implementations of the subject matter can include one or more features, alone or in combination. For example:

In a first implementation, a Powder Dispersal Target Impact Indication System (PDS), comprising: a body configured to contain a powdered substance for dispersal into air external to the body on impact of a target by a firearm projectile; a mounting structure used to mount the body to the target; a securing cap configured to retain the powdered substance within the body; and a dispersal aperture configured to disperse the powdered substance.

The foregoing and other described implementations can each, optionally, include one or more of the following features:

A first feature, combinable with any of the following features, wherein the body is mounted to the target using a mounting structure.

A second feature, combinable with any of the previous or following features, wherein the mounting structure includes at least one of magnets, adhesive strips, hook-and-loop tape, or clips.

A third feature, combinable with any of the previous or following features, further comprising, dispersing the powdered substance on impact of the target by the firearm projectile.

A fourth feature, combinable with any of the previous or following features, wherein the powdered substance includes chalk, mica, or glitter.

A fifth feature, combinable with any of the previous or following features, wherein the body comprises supporting ribs.

A sixth feature, combinable with any of the previous or following features, further comprising a powdered substance container configured to contain the powdered substance.

A seventh feature, combinable with any of the previous or following features, wherein the powdered substance container is configured to be retained within the body.

A eighth feature, combinable with any of the previous or following features, wherein the dispersal aperture is configured with one or more holes of adjustable size.

A ninth feature, combinable with any of the previous or following features, further comprising a computer and software.

A tenth feature, combinable with any of the previous or following features, further comprising one or more sensors integrated with the computer and software.

An eleventh feature, combinable with any of the previous or following features, further comprising transmitting data obtained from the one or more sensors to a mobile computing device.

In a second implementation, a method for dispersing powdered substances based on impact, comprising: mounting a body to a target, the body configured to contain a powdered substance; loading the powdered substance into the body; configuring a securing cap to retain the powdered substance within the body; configuring a dispersal aperture; receiving an impact on the target by a firearm projectile; and dispersing the powdered substance into air external to the body through the dispersal aperture.

The foregoing and other described implementations can each, optionally, include one or more of the following features:

A first feature, combinable with any of the following features, wherein the body is mounted to the target using a mounting structure.

A second feature, combinable with any of the previous or following features, wherein the mounting structure includes at least one of magnets, adhesive strips, hook-and-loop tape, or clips.

A third feature, combinable with any of the previous or following features, wherein configuring the dispersal aperture comprises adjusting a size of one or more holes used to disperse the powdered substance into the air.

A fourth feature, combinable with any of the previous or following features, further comprising operating one or more one or more sensors integrated with the body.

A fifth feature, combinable with any of the previous or following features, further comprising transmitting data obtained from the one or more sensors to a mobile computing device.

A sixth feature, combinable with any of the previous or following features, further comprising operating one or more one or more lights integrated with the body.

A seventh feature, combinable with any of the previous or following features, further comprising generating one or more audio tones.

Some aspects of implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A Powder Dispersal Target Impact Indication System (PDS), comprising:
    a body mounted to a target and configured to contain a powdered substance for dispersal into air external to the body following a non-penetrative impact of the target and the body by a firearm projectile;
    a mounting structure used to mount the body to the target;
    a securing cap configured to retain the powdered substance within the body; and
    a dispersal aperture configured to disperse the powdered substance.

2. The PDS of claim 1, wherein the body is mounted to the target using a mounting structure.

3. The PDS of claim 2, wherein the mounting structure includes at least one of magnets, adhesive strips, hook-and-loop tape, or clips.

4. The PDS of claim 1, further comprising, dispersing the powdered substance on impact of the target by the firearm projectile.

5. The PDS of claim 1, wherein the powdered substance includes chalk, mica, or glitter.

6. The PDS of claim 1, wherein the body comprises supporting ribs.

7. The PDS of claim 1, further comprising a powdered substance container configured to contain the powdered substance.

8. The PDS of claim 7, wherein the powdered substance container is configured to be retained within the body.

9. The PDS of claim 1, wherein the dispersal aperture is configured with one or more holes of adjustable size.

10. The PDS of claim 1, further comprising a computer and software.

11. The PDS of claim 10, further comprising one or more sensors integrated with the computer and software.

12. The PDS of claim 11, further comprising transmitting data obtained from the one or more sensors to a mobile computing device.

13. A method for dispersing powdered substances based on impact using a Powder Dispersal Target Impact Indication System (PDS), comprising:
    mounting a body to a target, the body configured to contain a powdered substance;
    loading the powdered substance into the body;
    configuring a securing cap to retain the powdered substance within the body;
    configuring a dispersal aperture;
    receiving a non-penetrative impact on the target and the body by a firearm projectile; and
    dispersing the powdered substance into air external to the body through the dispersal aperture.

14. The method of claim 13, wherein the body is mounted to the target using a mounting structure.

15. The method of claim 14, wherein the mounting structure includes at least one of magnets, adhesive strips, hook-and-loop tape, or clips.

16. The method of claim 13, wherein configuring the dispersal aperture comprises adjusting a size of one or more holes used to disperse the powdered substance into the air.

17. The method of claim 13, further comprising operating one or more one or more sensors integrated with the body.

18. The method of claim 17, further comprising transmitting data obtained from the one or more sensors to a mobile computing device.

19. The method of claim 13, further comprising operating one or more one or more lights integrated with the body.

20. The method of claim 13, further comprising generating one or more audio tones.

* * * * *

UNITED STATES PATENT AND TRADEMARK OFFICE
CERTIFICATE OF CORRECTION

PATENT NO. : 11,920,909 B2
APPLICATION NO. : 17/576345
DATED : March 5, 2024
INVENTOR(S) : Jon Paul Gonzales Page 1 of 1

It is certified that error appears in the above-identified patent and that said Letters Patent is hereby corrected as shown below:

In the Claims

Column 16, Line 36, Claim 17, delete "one or more one or more" and insert -- one or more --.

Column 16, Line 41, Claim 19, delete "one or more one or more" and insert -- one or more --.

Signed and Sealed this
Twenty-first Day of May, 2024

Katherine Kelly Vidal
*Director of the United States Patent and Trademark Office*